United States Patent Office 2,765,307
Patented Oct. 2, 1956

2,765,307

HYDROXYAMINES

Claude J. Schmidle, Moorestown, N. J., assignor to Rohm & Haas Company, Philadelphia, Pa., a corporation of Delaware No Drawing. Application February 11, 1953, Serial No. 336,453

6 Claims. (Cl. 260—247.7)

This invention deals with hydroxyamines of the structure

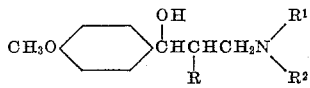

wherein R is hydrogen or an alkyl group, $R^1$ and $R^2$ are individually aliphatic groups or when taken together represent a divalent saturated aliphatic chain which together with the nitrogen form a monocyclic heterocycle. This invention also relates to the process whereby these hydroxyamines are made.

As is shown in my application Serial No. 240,979, filed August 8, 1951, now abandoned, of which this application is a continuation-in-part, olefinically unsaturated compounds react with formaldehyde and ammonia, primary amines, or secondary amines to form basic nitrogen compounds. With olefinically unsaturated hydrocarbons there are formed ordinarily unsaturated amines and/or heterocyclic bases, such as tetrahydro-1,3-oxazines.

It has now been found that olefinically unsaturated compounds having a methoxyphenyl substituent react with formaldehyde and secondary amines to form tertiary amines having a secondary hydroxyl group. This reaction takes place in the presence of an acid catalyst at temperatures from about 40° to 100° C. Apparently the methoxy group so activates the olefinic linkage of the starting compound that the reaction of olefinic compound, formaldehyde, and secondary amine takes place under mild conditions and the hydroxyamine thus formed is sufficiently stable under these conditions to permit its isolation.

As olefinically unsaturated compounds, there may be here used p-methoxystyrene, p-methoxy-β-methylstyrene, p - methoxy - o,o' - dimethylstyrene, p - methoxy - β-ethylstyrene, and other alkyl substituted styrenes of the formula

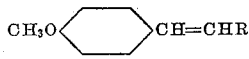

where R is hydrogen or alkyl, particularly an alkyl group of not over two carbon atoms. Equivalent to these methoxy compounds there is the closely related substance, isosafrole.

As a secondary amine there may be used dimethylamine, diethylamine, dipropylamine, dibutylamine, dihexylamine, dioctylamine, octylmethylamine, dodecylmethylamine, or other dialkylamine having alkyl groups of not over 12 carbon atoms each and desirably a carbon atom content of not over about 16. Another very useful group of secondary amines is composed of heterocyclic secondary amines, such as pyrrolidine, piperidine, morpholine, 3,5-dimethyl-morpholine, N-methylpiperazine, thiamorpholine, and the like. Here $R^1$ and $R^2$ together form a divalent saturated aliphatic group, of which —CH₂CH₂CH₂CH₂—, —CH₂CH₂CH₂CH₂CH₂—, and —CH₂CH₂OCH₂CH₂— are examples. The divalent chains and the nitrogen form a five- to six-sided heterocycle.

Formaldehyde may be used in the form of aqueous 30% to 50% formaldehyde solution or in the form of a revertible polymer. Mixtures of these forms may be used.

As a catalyst there may be used a strong inorganic acid such as sulfuric, or phosphoric. Acetic acid acts as a weak catalyst, but is also useful as a solvent. Other organic solvents may be used, such as propionic acid, acetonitrile, or dioxane, and with the less polar amines hydrocarbon solvents at least in part may be used.

The reaction is effected by bringing together the various reactants in about equivalent proportions. The exact order of mixing is not critical. Acid and amine may, if desired, be first mixed to form an amine salt. The acid is found later in the salt of the product hydroxyamine. The reaction mixture is most conveniently resolved by treating it with water to take up the salt of the product. Unreacted starting material is removed. The aqueous solution of the salt of the product is made basic to liberate the hydroxyamine, which is separated and purified as desired. Where the hydroxyamines do not boil at very high temperatures, they can be purified by distilling under reduced pressure.

Typical preparations are described in the following illustrative examples. Parts are by weight.

Example 1

To 70 parts of cooled, stirred glacial acetic acid there is slowly added morpholine in an amount of 44 parts. There are then slowly added 30 parts of 83% sulfuric acid and then 13 parts of paraformaldehyde. The mixture is stirred and heated until a clear solution results. Addition is then slowly made of 52 parts of p-methoxystyrene. A vigorous reaction ensues. Stirring is continued for another hour. The temperature of the mixture gradually decreases to about 30° C. The mixture is left standing for 16 hours and is poured into 500 parts of water. The resulting mixture is twice extracted with benzene in portions of about 100 parts each. The aqueous layer is then treated with ammonium hydroxide until basic. The hydroxyamine is taken up in benzene and the aqueous layer is twice extracted with 80 part portions of benzene. The several benzene solutions are combined and distilled. At 170°–190° C./2 mm. a fraction is obtained which amounts to 41 parts and corresponds in composition to 1-methoxyphenyl-3-morpholinopropanol. This fraction is redistilled to give a main cut of product coming over at 180°–185° C./2 mm. This has a refractive index, $n_D^{25}$, of 1.5328.

Example 2

In the same way there are brought together 42 parts of piperidine, 70 parts of acetic acid, 30 parts of 83% sulfuric acid, 15 parts of paraformaldehyde, and 65 parts of p-methoxystyrene. After reaction has occurred, the reaction mixture is resolved in the same way, the salt of the product being taken up in water. The aqueous solution is extracted to remove unreacted starting material. The salt is then decomposed by adding excess sodium hydroxide. The hydroxyamine separates and is collected. It distills at 168°–172° C./2 mm. to give 1-methoxyphenyl-3-piperidinopropanol. This compound has a refractive index of 1.5340 at 25° C.

Example 3

In place of the above amines there is used pyrrolidine. The product distills at 155°–165° C./2.4 mm. It has a refractive index, $n_D^{25}$, of 1.5284 and corresponds in composition to 1-methoxyphenyl-3-pyrrolidinopropanol.

In the same way other heterocyclic secondary amines can be reacted to form other methoxyphenyl-3-aminopropanols. In place of methoxystyrene there may be used other compounds of this type, such as p-methoxy-β-methylstyrene. Typical products from this starting material are 1-methoxyphenyl-2-methyl-3-morpholinopropanol and 1-methoxyphenyl-2-methylpyrrolidinopropanol. The above heterocyclic amines may be replaced with related secondary heterocyclic amines or with other types of secondary amines. The most important of these are the dialkylamines.

*Example 4*

There are mixed 90 parts of glacial acetic acid and 56 parts of aqueous 85% dimethylamine sulfate. To this mixture paraformaldehyde (15 parts) is added and the mixture is gently heated. Thereto p-methoxy-β-methylstyrene is slowly added in an amount of 70 parts. A vigorous reaction results. Thereafter the reaction mixture is worked up as in Example 1. The oil which separates when the aqueous solution is made basic is 1-p-methoxyphenyl-2-methyl-3-dimethylaminopropanol, which distills at 137°–140° C./1.2 mm. and has a refractive index, $n_D^{25}$, of 1.5144. The distillate here obtained contains by analysis carbon, 69.75%; hydrogen, 9.44%; and nitrogen, 6.34%. Theoretical values are 69.91%, 9.48%, and 6.28%, respectively.

*Example 5*

In the same way there are brought together 90 parts of acetic acid, 50 parts of dipropylamine, 60 parts of 83% sulfuric acid, 15 parts of paraformaldehyde, and 65 parts of p-methoxystyrene. The reaction product is worked up as above to give 1-methoxyphenyl-3-dipropylaminopropanol, distilling at 165°–175° C./2 mm.

In place of dimethylamine or dipropylamine there may be used other dialkylamines to give corresponding p-methoxyphenyl-3-dialkylaminopropanols, compounds of the structure CH₃O phenyl CH(OH)CH(R)CH₂N(alkyl)₂ where the alkyl groups contain up to 12 carbon atoms each and at best one to four carbon atoms each.

*Example 6*

The procedure of Example 4 was followed with substitution of 80 parts of isosafrole for the p-methoxy-β-methylstyrene. The product is collected at 125°–135° C./0.4 mm. It has a refractive index of 1.5241 and corresponds in composition to

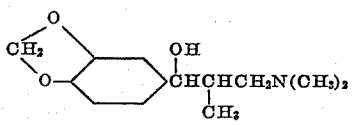

This compound is illustrative of the group of compounds of the formula

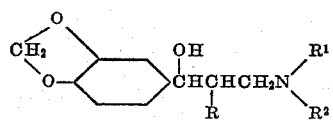

where R is hydrogen or alkyl and R¹ and R² have the significance given above, including both alkyl groups and divalent chains which form a five- to six-sided heterocycle with the nitrogen. These heterocyclic amino alcohols are of particular interest.

The compounds of this invention find many uses. Those with small alkyl groups have vasoconstrictor action. The products having heterocyclic amino groups, particularly the morpholino group, are effective as gas fading inhibitors in textiles. The compounds with larger N-substituents have surface activity. All of the compounds show definite corrosion inhibiting value in acid solutions. The compounds are also useful as chemical intermediates. They form esters through their hydroxyl group and react with ethylene oxide. Surface active derivatives are obtainable in this way. The compounds can be dehydrated to useful olefinic amines. These amines can be reacted with phenols and other aromatics to give pharmaceutically useful compounds. The tertiary amine group can be converted to reaction with alkylating agents to quaternary ammonium compounds which are useful as bactericides, fungicides, and cation-active agents.

I claim:

1. A process for preparing ether hydroxy tertiary amines of the class consisting of compounds of the formula

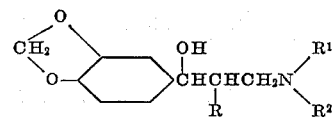

and

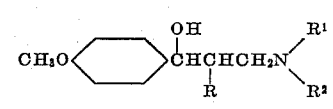

which comprises reacting together in the presence of a catalyst from the class consisting of sulfuric acid, phosphoric acid, acetic acid and mixtures of sulfuric acid and acetic acid and phosphoric acid and acetic acid between 40° and 100° C. formaldehyde, a secondary amine of the formula

HNR′R² and an unsaturated compound from the class consisting of isosafrole and compounds of the formula

wherein R is a member of the class consisting of hydrogen and alkyl groups of not over two carbon atoms and R¹ and R² when taken individually represent alkyl groups of not over four carbon atoms each, and when taken together represent a saturated divalent aliphatic chain which with the amino nitrogen forms a monocyclic heterocycle of the class consisting of pyrrolidine, piperidine, and morpholine.

2. The process of preparing a compound of the formula

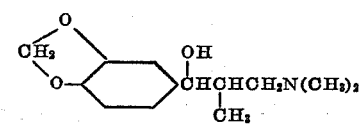

which comprises reacting together between 40° and 100° C. dimethylamine sulfate, formaldehyde, and isosafrole.

3. The process of preparing a compound of the formula

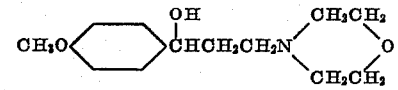

which comprises reacting together between 40° and 100° C. in the presence of sulfuric acid as catalyst morpholine, formaldehyde, and p-methoxystyrene.

4. The process of preparing a compound of the formula

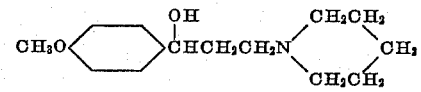

which comprises reacting together between 40° and 100° C. in the presence of sulfuric acid as catalyst piperidine, formaldehyde, and p-methoxystyrene.

5. The process of preparing a compound of the formula

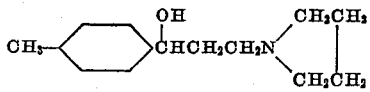

which comprises reacting together between 40° and 100° C. in the presence of sulfuric acid as catalyst pyrrolidine, formaldehyde, and p-methoxystyrene.

6. The process of preparing a compound of the formula

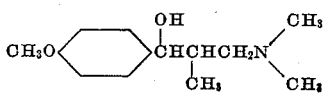

which comprises reacting together between 40° and 100° C. dimethylamine sulfate, formaldehyde and p-methoxy-β-methylstyrene.

References Cited in the file of this patent

UNITED STATES PATENTS

| | | |
|---|---|---|
| 1,964,973 | Bockmuehl et al. | July 3, 1934 |
| 1,978,539 | Klarer et al. | Oct. 30, 1934 |
| 2,411,664 | Miescher et al. | Nov. 26, 1946 |
| 2,647,117 | Hartough et al. | July 28, 1953 |
| 2,647,118 | Hartough et al. | July 28, 1953 |

FOREIGN PATENTS

| | | |
|---|---|---|
| 48,334 | Australia | June 10, 1911 |
| 569,149 | Germany | Feb. 2, 1934 |
| 657,302 | Great Britain | Sept. 19, 1951 |

OTHER REFERENCES

Denton et al.: JACS vol. 71, pp. 2050–56 (1949).
Breslow et al.: JACS, vol. 67, pp. 1472–5 (1945).
Mannich et al.: Chem. Abst., vol. 17, pp. 1795–7 (1923).
Mannich et al.: Chem. Abst., vol. 27, p. 3705 (1933).